(12) United States Patent
Stern

(10) Patent No.: US 6,572,661 B1
(45) Date of Patent: Jun. 3, 2003

(54) SYSTEM AND METHOD FOR AUTOMATED ANNOTATION OF FILES

(75) Inventor: Thomas A Stern, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/228,812

(22) Filed: Jan. 11, 1999

(51) Int. Cl.$^7$ ............................................... G06F 15/00
(52) U.S. Cl. ..................... 715/501.1; 717/122; 717/124
(58) Field of Search ............................. 707/501.1, 512, 707/513, 4, 5; 717/8, 122, 124

(56) References Cited

U.S. PATENT DOCUMENTS

| | | | | |
|---|---|---|---|---|
| 5,303,361 A | * | 4/1994 | Colwell et al. ................. | 707/4 |
| 5,465,353 A | * | 11/1995 | Hull et al. ...................... | 707/5 |
| 5,717,922 A | * | 2/1998 | Hohensee et al. ........... | 707/100 |
| 5,764,972 A | * | 6/1998 | Crouse et al. ................. | 707/1 |
| 5,784,608 A | * | 7/1998 | Meske, Jr. et al. .............. | 707/2 |

OTHER PUBLICATIONS

"Microsoft Press Computer Dictionary" Microsoft Corporation, Third Edidition, 1997, p. 24.*

* cited by examiner

Primary Examiner—Joseph H. Feild
Assistant Examiner—Maikhanh Nguyen
(74) Attorney, Agent, or Firm—Hickman Palermo Truong & Becker LLP

(57) ABSTRACT

A method and apparatus links descriptions with the thing that is described to allow them to be maintained separately but displayed with one another. The description contains a portion of the thing described to allow the link to be made. The method and apparatus can link the description with thing that is similar, but not identical, to the portion in the description, allowing the description to be linked, even if minor changes to the thing described no longer match the portion in the description.

34 Claims, 3 Drawing Sheets

SYSTEM AND METHOD FOR AUTOMATED ANNOTATION OF FILES

FIELD OF THE INVENTION

The present invention is related to computer software and more specifically to automated training computer software.

BACKGROUND OF THE INVENTION

To train engineers on the operation of complex computer software, it can be helpful to perform a "code walk-through." In a code walk-through, engineers being trained are shown a portion of the computer software source code known as the code, as an instructor describes how that portion of the code operates. The description may contain an explanation of a complexity or nuance that an engineer might not notice by himself.

The problem with a code walk-through is that it is very labor-intensive. A trained instructor must perform it with one or more engineer-trainees. The instructor and the engineers are required to be present at the same time to perform the walk-through. Because of the expense of the instructor, code walk-throughs may be scheduled only when a sufficient number of engineers require training. The first engineers to require training must wait until others require it as well; leaving the first engineers untrained for some period of time. If the instructor leaves the company, he must train another trainer, which is not only labor intensive, but can also cause details to become lost if they are not communicated from one trainer to the next.

These problems have been addressed with text-based code walk-throughs. A text-based code walk-through contains the code and explanatory material in text-based form. For example, one side of a page may contain the software code and the other side contains a text based description of the code, similar to that which an instructor would relate in a classroom. Arrows from the description to the relevant code section may be placed on the page to allow the reader to identify the pertinent code section described. Instead of arrows, a footnote arrangement may also be used.

However, as the computer software being described changes, the description must move with the pertinent section of the code it describes to allow the engineer trainees to easily locate the code being described. For a large computer program that may change frequently, the maintenance of the description becomes a monumental task. This task is made even more difficult when minor changes are made to the code described by the description, making it difficult to locate the pertinent code section described.

What is needed is a method and apparatus that can allow a text based code walk-though description to automatically change location with the pertinent code, even if minor changes are made to the text of the code itself.

SUMMARY OF INVENTION

A method and apparatus reads two files, a source file, containing an item such as source code, and an annotation file, containing descriptions of different portions of the item. The annotation file also contains commands to the method and apparatus, beginning with codes known as "tags". The method and apparatus writes two output files, an annotation HTML file and a source HTML file, that are similar to the corresponding input files, except they do not contain the commands, and contain cross links to the other output file, allowing the relationship between the annotation HTML file and the source HTML file to be automatically generated. The tags describe where to locate the cross links. A "match tag" instructs the method and apparatus to build a cross link between the current location of the annotation HTML file and a specific location in the source HTML file. The specific location is identified by the method and apparatus by locating text in the source input file that is similar to the text contained in the command beginning with the match tag. A command beginning with a "set confidence level tag" determines the degree of similarity required to identify the specific location in the source HTML file. Other commands starting with other tags allow HTML commands or spaces to be inserted into the annotation HTML file. The method and apparatus can build other links to the other output file as well as links within the same output file.

DETAILED DESCRIPTION OF A PREFERRED EMBODIMENT

Figure 1:
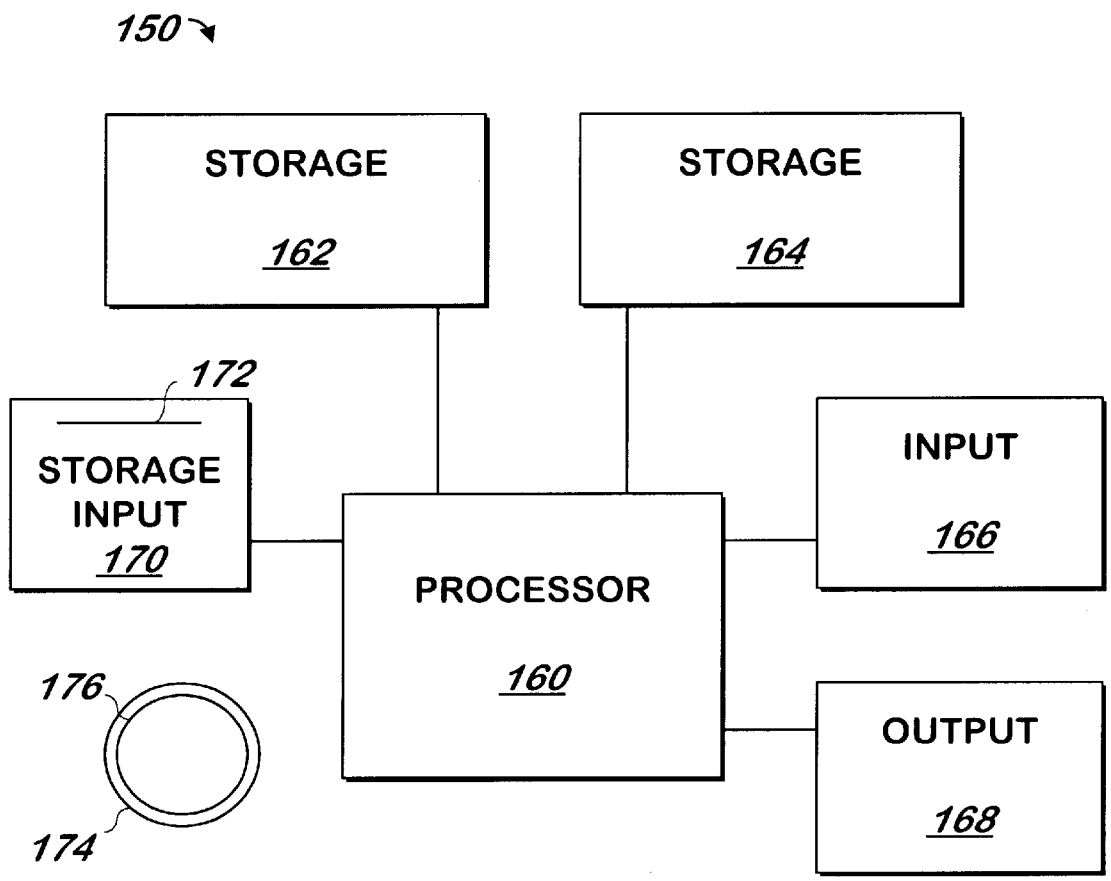
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 1 Creator computer running the Solaris 2.5.1 operating system commercially available from Sun Microsystems of Mountain View, Calif., although other systems may be used.

In one embodiment, there are two input files used by the present invention. One file contains the thing described and the other file contains the descriptions of the thing, referred to herein as annotations. For purposes of example, the thing is described as computer source code, but the present invention applies to any thing.

The file containing the code is referred to as a source file and the file containing the descriptions of the code is referred to as an annotation file. One embodiment of the present invention converts the annotation and source files into HTML files, and inserts hyperlinks between pertinent points of each of the files. Conversion into HTML provides a widely available viewing platform using any web browser, however, other file formats may be used. HTML is described in Castro, *HTML 4 for the World Wide Web* (Peachpit Press, 1998). The source file may contain any content, and need not be limited to computer software source code, although computer software source code is used herein for purposes of example.

Figure 2:
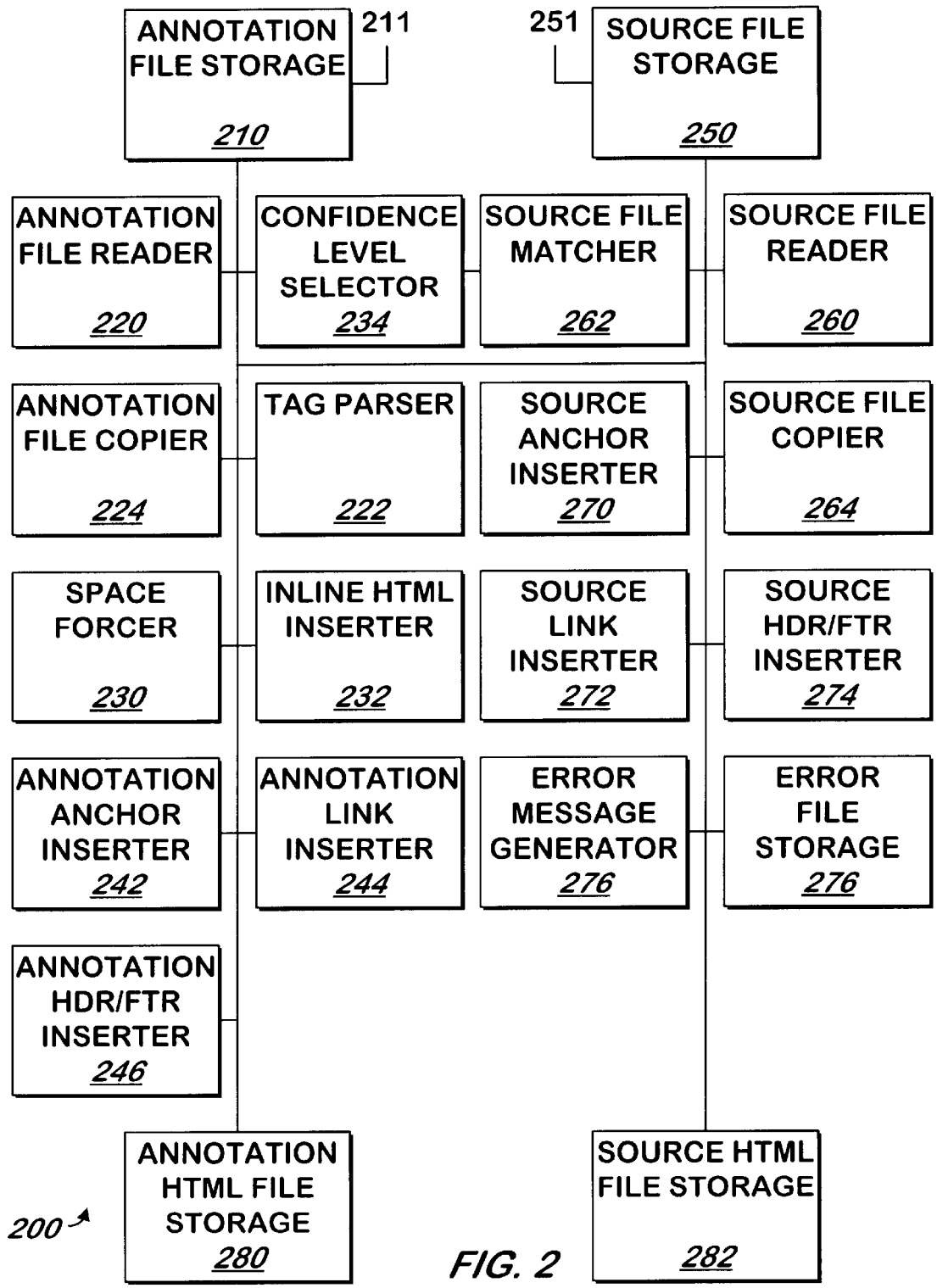
FIG. 2 is a block schematic diagram of an apparatus for converting an annotation file and a source file into an annotation HTML file and a source HTML file according to one embodiment of the present invention.

Referring now to FIG. 2, an apparatus for converting an annotation file and a source file into an annotation HTML file and a source HTML file is shown according to one embodiment of the present invention. The annotation file is received at input 211 and stored into annotation file storage 210. The source file is received at input 251 and stored in source file storage 250. Annotation file reader 220 reads the annotation file stored in annotation file storage 210 one line at a time. It isn't necessary to read the annotation file one line at a time. However, because it simplifies the description, such line-at-a-time line reading will be assumed herein. Annotation file reader 220 signals tag parser 222 when it has read a line of the annotation file.

Tag parser 222 identifies whether the line read by annotation file reader 220 starts with a tag. A "tag" identifies the start of a command. In one embodiment, possible tags all are "$T:", a "match tag" to identify the start of a "match" command, "$H:", an "inline HTML tag" to identify the start of an "inline HTML" command, "$S:", a "spacing tag" to identify the start of a "spacing" command, and "$C:", a "set confidence level tag" to identify the start of a "set confidence level" command, each described in more detail below.

If the line does not begin with one of these tags, tag parser signals annotation file copier 224. Annotation file copier 224 copies the line from annotation file reader 220 into annotation HTML file storage 280. After the line is written, annotation file copier 224 signals annotation file reader 220 to read the next line of the annotation file stored in annotation file storage 210.

If the tag is a set confidence level tag, tag parser 222 signals confidence level selector 234. Confidence level selector 234 retrieves the line stored in annotation file reader 220 and sets an internal confidence level variable in storage therein equal to the value indicated in the remainder of the command following the tag. The confidence level variable is used as described in more detail below. Confidence level selector 234 signals annotation file reader 220 to read the next line in the annotation file stored in annotation file storage 210.

If the tag is a spacing tag, tag parser 222 signals space forcer 230. Space forcer 230 inserts into the annotation HTML file stored in annotation HTML file storage 280 a code to cause a browser to insert a vertical space, such as using the conventional HTML "spacer" command. Space forcer 230 signals annotation file reader 220 to read the next line in the annotation file stored in annotation file storage 210.

If the tag is an inline HTML tag, tag parser 222 signals inline HTML inserter 232, and sets a flag stored inside tag parser 222. Inline HTML inserter 232 copies the line in annotation file reader 220 into annotation HTML file storage 280. Inline HTML inserter 232 signals annotation file reader 220 to retrieve the next line from annotation file stored in annotation file storage 210. Annotation file reader 220 retrieves the next line and signals tag parser 222 as described above. However, because tag parser has set the internal flag indicating that an inline HTML tag is active, tag parser 222 operates slightly differently from the manner described above. If tag parser 222 determines the line does not begin with the tag, instead of signaling annotation file copier 224, tag parser 222 signals inline HTML inserter 232. Inline HTML inserter 232 copies the line from annotation file reader 220 into annotation HTML file storage 280, and then signals annotation file reader 220. This operation allows inline HTML to be copied into the annotation HTML file stored in annotation HTML file storage 280 until tag parser 222 detects another tag at the beginning of another line in the annotation file. When tag parser 222 identifies any such tag, tag parser 222 clears the internal variable and operates as described herein.

If the tag is a match tag, tag parser 222 signals source file reader 260 and source file matcher 262. Source file matcher 262 retrieves from annotation file reader 220 the text following the match tag, referred to herein as the "match text". This match text defines text to be located in the source file stored in source file storage 250. Source file reader 260 reads the source file one line at a time similar to annotation file reader 220. Source file reader 260 signals source of file matcher 262 at the end of each line it reads, and source file matcher 262 determines whether the line contains a match with the text of the match tag it retrieved from annotation file reader 220.

Source file matcher 262 determines whether a match has occurred with the line in source file reader 260 and the match text it retrieved the annotation file reader 220 by attempting to match on a character by character basis the characters in the match text with the characters in the line stored in source file reader 260. Source file matcher 262 compares the first character in the match text with the first character in source file reader 260. If the characters match, source file matcher 262 increments an internal match counter that is cleared when the source file matcher 262 is first signaled by tag parser 222. Additionally, source file matcher 262 increments an internal character counter also cleared when source file matcher 262 is signaled by tag parser 222. If the characters do not match, source file matcher 262 stores the character counter into a internally stored variable, last match, and increments the character counter. Source file matcher 262 then moves to the next character in the source file reader 260 and attempts to match this character with the next character in the match text, incrementing both counters if a match occurs, and only incrementing the character counter if no match occurs. Source file matcher 262 continues this process until all characters in the match text have been used to match with the characters in the source file reader 260. Source file matcher 262 then counts the characters following the match tag in the line it retrieved from annotation file reader 220.

Source file matcher 262 identifies whether a match has occurred by dividing the match counter by the number of characters following the match tag in the line source file matcher retrieved from annotation file reader 220. If the result is greater than the confidence level stored in confidence level selector 234, a match has occurred. Otherwise, a match has not occurred, and source file matcher 262 signals source file copier 264.

In one embodiment, source file matcher 262 converts all characters to upper case and removes all spaces or other "whitespace" before matching as above, and the match is performed on the converted copy. (The original text is copied to the HTML file).

If no match occurs, source file matcher 262 signals source file copier 264. Source file copier 264 copies the line of the source file stored in source file reader 260 into source HTML file storage 282. Source file copier 264 signals source file matcher 262. Source file reader 260 retrieves the next line in source file storage 250 and signals source file matcher 262 which attempts to match the same match text it retrieved earlier from annotation file reader 220 with the new line retrieved from source file reader 260.

If source file reader 260 reaches the end of the match file, source file reader 260 signals source file matcher 262. If source file matcher 262 has not yet located a match for the most recent match text it received, source file matcher 262 signals error message generator 276. Error message generator 276 generates an error message and places it into an error file in error file storage 276, or to a monitor connected to an output not shown, or both.

If a match occurs, source file matcher 262 signals annotation anchor inserter 242, annotation link inserter 244, source link inserter and source anchor inserter 270. Annotation anchor inserter 242 builds an anchor to identify the current location in the annotation html file and passes it to annotation HTML file storage, which stores it in the line after the prior line it stored in the annotation HTML file. Annotation anchor inserter 242 builds the anchor using a numeric identifier, starting with 0001, which it increments after each anchor it builds. Thus, each anchor has a name that is a text string that represents a number one higher than the number represented by the text string of the prior anchor.

Source anchor inserter 270 builds an anchor to identify the current location of the source file and passes the anchor to source HTML file storage 282, which stores it in the line after the prior line it stored in the source HTML file. Source anchor inserter 270 also names each anchor using a numeric name that is a string representing a number one higher than the name of the prior anchor, beginning with 0001. Other names of anchors may be used by annotation anchor inserter 242 and source anchor inserter 270 as long as each anchor name is unique.

Annotation anchor inserter 242 passes the name of the anchor it generates to source link inserter 272. Source link inserter 272 inserts a link to this anchor in the annotation HTML file stored in annotation HTML file storage 280 and sends the link to source file HTML file storage 282 for storage therein. Source file HTML file storage 282 stores the link it receives immediately after the anchor it receives as described above.

Source anchor inserter 270 passes the name of the anchor it generates to annotation link inserter 244. Annotation link inserter 244 inserts a link to this anchor in the source HTML file stored in source HTML file storage 282 in source HTML file storage 282 and sends the link to annotation HTML file storage 280 for storage therein. Annotation file HTML storage 280 stores the link it receives immediately after the anchor it receives as described above.

Any number of these devices 242, 270 may signal annotation file copier 224, which copies the line in the annotation file in annotation file storage 210 into annotation HTML file storage 280, and signals annotation file reader 220 to read the next line in the annotation file stored in annotation file storage 210, and the system 200 repeats the operation described above until annotation file reader reads the end of the annotation file.

When annotation file reader 220 reaches the end of the annotation file stored in annotation file storage 210, annotation file reader signals source file reader 260 and source file copier 264. Source file reader 260 and source file copier 264 copy the remainder of the source file stored in source file storage 250 into source HTML file storage 282 one line at a time as described above until the end of the source file stored in source file storage 250 is reached. If source file reader 260 reaches the end of the source file stored in source file storage 250 before receiving the signal from annotation file reader 220 that the end of the annotation file has been reached, source file reader 260 signals error message generator 280.

Error message generator 276 generates an error message in response to the signal from source file reader 260 that informs the user of the system 200 that an error has occurred. The error message generated by error message generator 280 contains a description of the error and an approximate location of the error to assist the user of the system 200 in identifying and fixing the cause of the error. The error message may be provided by error message generator 280 to an output device such as a monitor, or stored in an error file stored in error file storage 282.

Optional Links

In one embodiment, optional links are set up within the system in addition to those described above. The optional links can include a link to the next anchor in the same file, the prior anchor in the same file, the first anchor in the same file, and the last anchor in the same file. These links are arranged as described below in each of the source and annotation HTML files.

Annotation anchor inserter 242 sets up the links to the prior and next anchor in the annotation HTML file being written to annotation HTML file storage 280 when it builds each anchor as described above. Because each anchor is numbered, the name of the prior and next anchor are known as one less and one more than the anchor being placed in the file. If the anchor is the first anchor, no link to a prior anchor is set up with that anchor. If the anchor is the last anchor, no link to the next anchor is set up with that anchor. Because the existence of the last anchor is not known until the end of the file is reached, in one embodiment, annotation file reader 220 may scan ahead in the annotation file stored in annotation file storage 210 to allow it to identify the last link to annotation anchor inserter 242. Alternatively, annotation anchor inserted 242 may set up an anchor at the end of the annotation HTML file being written to annotation HTML file storage 280 when it receives a signal from annotation file reader that the end of the annotation file stored in annotation file storage 210 has been reached. In this case, the anchor inserted is known to be the last anchor and therefore annotation anchor inserter 242 does not build a link to the next anchor for this known last link.

Source anchor inserter 270 adds similar links to the source HTML file just as annotation anchor inserted does for the annotation HTML file as described above. Source file reader 260 provides the end of file signal for the source file if such an end of file indication is used as described above for the last anchor.

In one embodiment, other links are provided to the first anchor in the same file and to the other files in a header that is written by source header/footer inserter 274, which opens the source HTML file in source HTML file storage 282 and inserts the following text string before other text is inserted as described above:

```
<head>
<title>Source</title>
<meta name="GENERATOR" content="Cisco Systems, Inc.
Annotate 2.0">
<meta name="OTB Border" content="none">
</head>
<body bgcolor="#FFFFFF">
<p><code><strong><a name="0000">[code_example.c]  
  <a
href="#0001" target="pie">[First]</a>    <a
href="code_example_ann.htm#top" target="eat">[Annotation]</a>
    <a href="../bak.htm">[Cancel]
</a></strong></code></p>
```
(text string 1)

The first five lines of text string 1 add a title and metadata to the html file. The next line sets the background color to white. The last lines add links to the first anchor, a link to the annotation HTML file named code_example_ann.htm in a frame named "pie" and to a file called bak.htm that allows the user to cancel operation of the system.

When the source HTML file is completed as described above, source file reader 260 signals source header/footer inserter 274. Source header/footer inserter 274 inserts A footer is inserted onto the end of the source HTML file stored in source HTML file storage 282 reading

```
</body>
</html>
```
(text string 2)

A similar header and footer is inserted at the beginning and end of the annotation HTML file stored in annotation HTML file storage 280 by annotation header/footer inserter 246 with code_example_ann.htm#top" target="eat" replaced by "code_example.htm#top" target="pie" to point to the source.html file displayed in the other frame, pie. In other embodiments, footers for the source HTML or annotation HTML files can include a link to the second to the last anchor in the same file, anchor 0001, or a cancel link to bak.htm as described above.

To make the links easier to locate, they may appear in a left margin of each frame of the source HTML file. To create the margin in lines that do not have links, in one embodiment, source file copier 264 inserts the string "    " in front of every line copied from the source file stored in source file storage, except when signaled by source link inserter 272. Other techniques such as cascading style sheets and Javascripts can be used to create this margin instead of  . Source link inserter 272 provides such a signal when it inserts a link into the source HTML file. Annotation file copier 224 inserts the same or similar string unless signaled by annotation link inserter 244, which signals when it inserts a link.

Figure 3:
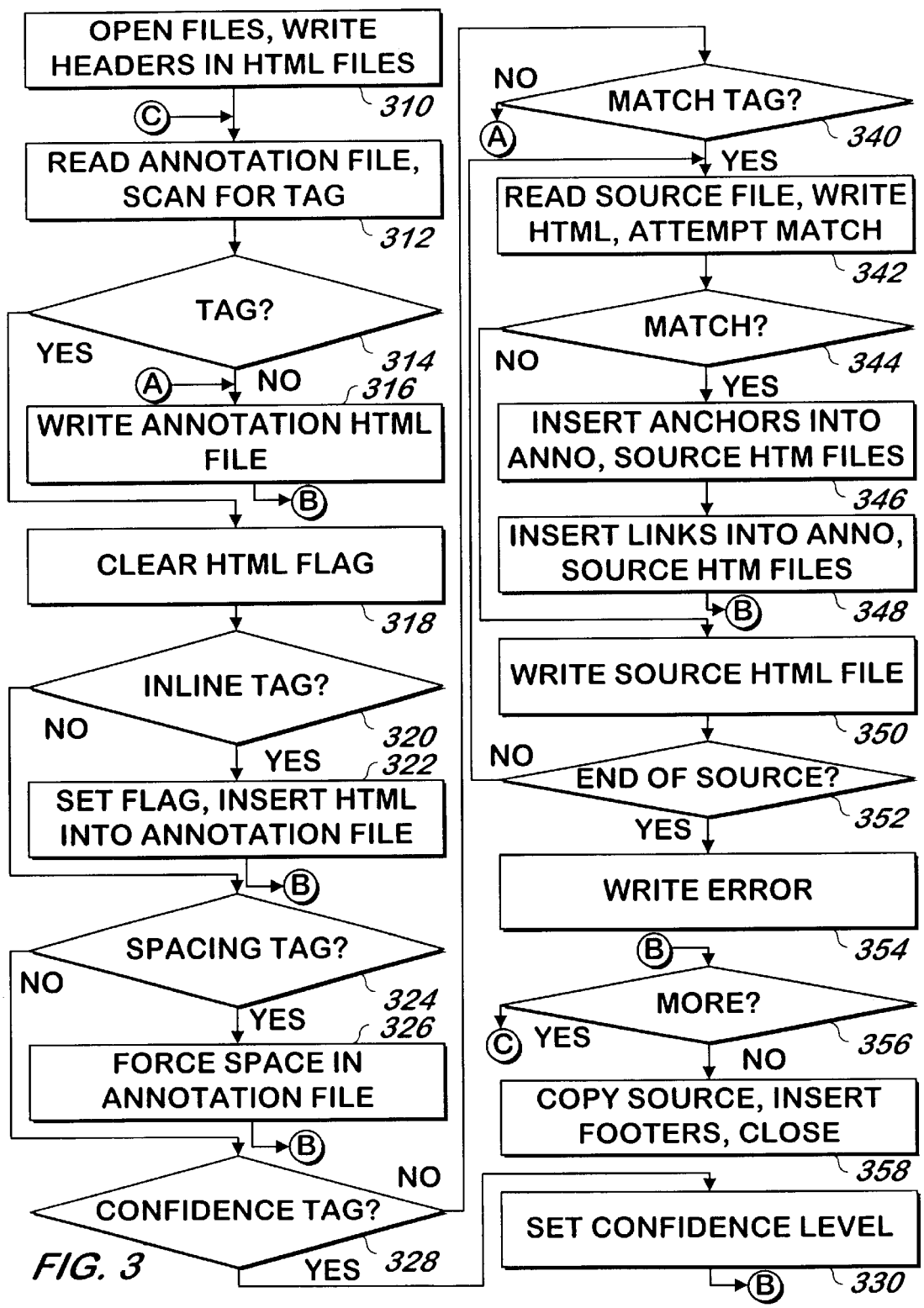
FIG. 3 is a flowchart illustrating a method of converting an annotation file and a source file into an annotation HTML file and a source HTML file according to one embodiment of the present invention.

Referring now to FIG. 3, a method of assembling an annotation HTML file and a source HTML file is shown according to one embodiment. The annotation and source files are opened along with the annotation HTML and source HTML files as described above 310. The header information is written into both HTML files as described above 310.

A line from the annotation file is read 312. The description below assumes the input files are manipulated one line at a time. As described above, it isn't necessary for the present invention to operate on one line of the source and annotation files at a time, but doing so simplifies the description. For example, the present invention can operate on a character-by-character basis if desired.

The line read in step 312 is examined to determine whether it contains a tag as described above 312. As described herein, tags are always at the beginning of the line, but the present invention operates with tags anywhere in the line.

If a tag is not found 314, the line is written to the annotation HTML file 316. As part of step 314, the line may be preceded with "    " as described above as long as the HTML flag, described below, is cleared. If the HTML flag is set, no such string is written in front of the line.

If the line read in step 312 does contain a tag 314, the tag may be an inline HTML tag, force spacing tag, set confidence level tag or match tag as described above. Although only these tags are described herein, a larger or smaller number of possible tags may be used by the present invention. In any of these cases, the HTML flag described below is cleared 318.

If the tag is an inline HTML tag 320, the line is copied into the annotation HTML file, and an HTML flag is set to active 322. Additional spacing text strings, such as the "    " described above are not inserted into the beginning of the line in the annotation HTML file, and while the HTML flag is activated, step 316 will not do so either, as described above. This allows any HTML to be copied from the annotation file to the annotation HTML file unchanged. The method continues at step 354, described below. If the tag was not an inline tag, the method continues at step 324.

If the tag is a force spacing tag 324, a space is forced in the annotation HTML file as described above 326 and the method continues at step 354. Otherwise, the method continues at step 328.

If the tag is a set confidence level tag 328, an internal confidence level variable is set 330 to the value specified by the characters following the tag. For example, $C90 would cause the confidence level variable to be set to 90%. The method continues at step 354. If the tag is not a set confidence level tag, the method continues at step 340.

If the tag is a match tag 340, a line from the source file is read 342. A match is attempted between the match text that followed the match tag in the annotation file and the line read from the source file 342 as described above. If a match does not occur 344, the line from the source file read in step 350 is written to the source HTML file. The source file is checked for an end of file condition, and if true 352, an error file is written 354 with a message describing that the source file unexpectedly terminated, along with the line number of the match tag that caused the error to be detected. The method terminates under this error condition in one embodiment.

If the end of the source file is not detected 352, the method continues at step 342, causing another line to be read from the source file and another match to be attempted until a match is located or the end of the source file is reached as described above.

If a match is detected 344, anchors are inserted 346 into the source HTML and annotation HTML files as described above. Links to these anchors are inserted 348 into these files as well, as described above. The links link the other HTML file, and may link the prior and next links as described above. The method continues at step 354.

If there is more content in the annotate file 356 (in other words, the end of the annotation file is not detected), the method continues at step 312. Otherwise, the remainder of the source file is copied into the source HTML file, footers to the HTML files are inserted as described above, and all files may be closed 358. The method terminates.

As described above, the source HTML files and annotate HTML files may be displayed in frames of a browser window using the conventional frames command. A separate frames HTML file that contains the frames command may be written as part of the present invention in step 310. The frames HTML file is the one that is specified by the user when the user wishes to view the two other HTML files.

What is claimed is:

1. An apparatus for providing a first file at a first file storage and a second file at a second file storage, the apparatus comprising:

a source file matcher having a first input coupled to receive a first portion of a third file, and a second input coupled to receive a second portion of a fourth file, the source file matcher for attempting to discern a similarity between the first and second portions, the source file matcher having a first state responsive to the source file matcher discerning the similarity between the first and second portions and a second state;

an annotation link inserter having an input coupled to the source file matcher output, the annotation link inserter for inserting in the first file at an output coupled to the first file storage a first link to the second file responsive to the source file matcher having the first state that is responsive to discerning the similarity between the first and second portions; and a source link inserter having an input coupled to the source file matcher output, the source link inserter for inserting in the second file at an output coupled to the second file storage a second link to the first file responsive to the source file matcher having the first state that is responsive to discerning the similarity between the first and second portions;

wherein a relationship is automatically generated between the first file and the second file based on the first and second links.

2. The apparatus of claim 1, additionally comprising:

an annotation anchor inserter having an input coupled to the source file matcher output, the annotation anchor inserter for inserting in the first file at an output coupled to the first file storage a first location identifier associated with the second file responsive to the source file matcher having the first state;

a source anchor inserter having an input coupled to the source file matcher output, the source anchor inserter for inserting in the second file at an output coupled to the second file storage a second location identifier associated with the first file responsive to the source file matcher having the first state; and wherein the first link is to the second location identifier and the second link is to the first location identifier.

3. The apparatus of claim 2, additionally comprising a source file copier having an input operatively coupled to receive the second portion of the fourth file, the source file copier for providing the second portion of the fourth file to an output coupled to the first file storage.

4. The apparatus of claim 3, wherein the first link and the second link are hyperlinks, and the first location identifier and the second location identifier are anchors.

5. A method of building a first file and a second file, comprising:

a. reading a first portion of a third file;

b. reading a second portion of a fourth file;

c. attempting to at least approximately match the first portion read with the second portion read; and d. responsive to the attempting step indicating at least an approximate match between the first portion read and the second portion read by:

i. identifying a first location for the first portion in the first file and a second location for the second portion in the second file; and ii. inserting a link to the first location into the second file; and iii. inserting a link to the second location into the first file;

e. writing the first portion read into the first file; and f. writing the second portion read into the second file.

6. The method of claim 5;

additionally comprising a step of locating a command, in the third file, identifying text to be attempted to be at least approximately matched; and wherein at least steps c and d are responsive to the locating the tag step.

7. The method of claim 6, wherein:

the attempting step comprises calculating a ratio of matching characters in the first portion and the second portion; and the attempting step indicates at least an approximate match between the first portion read and the second portion read responsive to the ratio.

8. The method of claim 7, comprising additional steps of:

reading a third portion of the third file; and locating a command in the third portion identifying a threshold associated with the ratio; and wherein the attempting step indicates at least an approximate match between the first portion read and the second portion read additionally responsive to the threshold located.

9. The method of claim 5, wherein the writing the first and second file steps each comprise writing in a format suitable for reading by a web browser.

10. The method of claim 9, comprising the additional step of displaying the first and second files in different frames of a web browser window.

11. The method of claim 5, comprising an additional step of responsive to the attempting step not indicating at least an approximate match between the first portion read and the second portion read, writing the second portion read into the second file.

12. The method of claim 5, comprising additional steps of:

reading a third portion of the third file;

attempting to locate a tag in the third portion read; and responsive to the attempting step not locating a tag in the third portion read, writing the third portion read into the first file.

13. A computer program product comprising a computer useable medium having computer readable program code embodied therein for building a first file and a second file, the computer program product comprising:

a. computer readable program code devices configured to cause a computer to read a first portion of a third file;

b. computer readable program code devices configured to cause a computer to read a second portion of a fourth file;

c. computer readable program code devices configured to cause a computer to attempt to at least approximately match the first portion read with the second portion read; and d. computer readable program code devices configured to cause a computer to, responsive to the attempting step indicating at least an approximate match between the first portion read and the second portion read by:
   i. identifying a first location for the first portion in the first file and a second location for the second portion in the second file; and
   ii. inserting a link to the first location into the second file; and
   iii. inserting a link to the second location into the first file;
e. computer readable program code devices configured to cause a computer to write the first portion read into the first file; and
f. computer readable program code devices configured to cause a computer to write the second portion read into the second file.

14. The computer program product of claim 13; additionally comprising computer readable program code devices configured to cause a computer to locate a command identifying text to be attempted to be at least approximately matched in the portion of the third file read; and
wherein at least code devices c and d are responsive to the locating the tag step.

15. The computer program product of claim 14, wherein:
the computer readable program code devices configured to cause a computer to attempt comprise computer readable program code devices configured to cause a computer to calculate a ratio of matching characters in the first portion and the second portion; and
the computer readable program code devices configured to cause a computer to attempt indicates at least an approximate match between the first portion read and the second portion read responsive to the ratio.

16. The computer program product of claim 15:
additionally comprising computer readable program code devices configured to cause a computer to:
   read a third portion of the first file; and
   locate a command identifying a threshold in the third portion read; and
   wherein the computer readable program code devices configured to cause a computer to attempt indicates at least an approximate match between the first portion read and the second portion read additionally responsive to the threshold located.

17. The computer program product of claim 13, wherein the computer readable program code devices configured to cause a computer to write the first and second files each comprise computer readable program code devices configured to cause a computer to write in a format suitable for reading by a web browser.

18. The computer program product of claim 17, additionally comprising computer readable program code devices configured to cause a computer to display the first and second files in different frames of a web browser window.

19. The computer program product of claim 13, additionally comprising computer readable program code devices configured to cause a computer to, responsive to the attempting step not indicating at least an approximate match between the first portion read and the second portion read, write the second portion read into the second file.

20. The computer program product of claim 13, additionally comprising computer readable program code devices configured to cause a computer to:
   read a third portion of the third file;
   attempt to locate a tag in the third portion read; and
   responsive to the computer readable program code devices configured to cause a computer to attempt not locating a tag in the third portion read, write the third portion read into the first file.

21. A method for automatically generating a relationship between files, the method comprising the computer-implemented steps of:
   reading a source file;
   reading an annotation file that includes a description of at least some content of the source file;
   identifying in the annotation file a match tag and associated content;
   determining whether the content is in a portion of the source file;
   if the content is not in the portion of the source file, then writing the portion of the source file to a converted source file; and
   if the content is in the portion of the source file, then
      creating a first anchor identifying a location in a converted annotation file;
      creating a second anchor identifying a location in the converted source file;
      inserting in the converted source file a first link to the first anchor; and
      inserting in the converted annotation file a second link to the second anchor.

22. The method of claim 21, wherein the source file contains computer source code and the annotation file contains a description of at least some of the computer source code.

23. The method of claim 21, wherein converted source file and the converted annotation file are HTML files.

24. A computer-readable medium carrying one or more sequences of instructions for automatically generating a relationship between files, which instructions, when executed by one or more processors, cause the one or more processors to carry out the steps of:
   reading a source file;
   reading an annotation file that includes a description of at least some content of the source file;
   identifying in the annotation file a match tag and associated content;
   determining whether the content is in a portion of the source file;
   if the content is not in the portion of the source file, then writing the portion of the source file to a converted source file; and
   if the content is in the portion of the source file, then
      creating a first anchor identifying a location in a converted annotation file;
      creating a second anchor identifying a location in the converted source file;
      inserting in the converted source file a first link to the first anchor; and
      inserting in the converted annotation file a second link to the second anchor.

25. The computer-readable medium of claim 24, wherein the source file contains computer source code and the annotation file contains a description of at least some of the computer source code.

26. The computer-readable medium of claim 24, wherein converted source file and the converted annotation file are HTML files.

27. An apparatus for automatically generating a relationship between files, comprising:
   means for reading a source file;
   means for reading an annotation file that includes a description of at least some content of the source file;

means for identifying in the annotation file a match tag and associated content;

means for determining whether the content is in a portion of the source file;

means for writing the portion of the source file to a converted source file if the content is not in the portion of the source file;

means for creating a first anchor identifying a location in a converted annotation file if the content is in the portion of the source file;

means for creating a second anchor identifying a location in the converted source file if the content is in the portion of the source file;

means for inserting in the converted source file a first link to the first anchor if the content is in the portion of the source file; and means for inserting in the converted annotation file a second link to the second anchor if the content is in the portion of the source file.

28. An apparatus for building a first file and a second file, comprising:

a. means for reading a first portion of a third file;

b. means for reading a second portion of a fourth file;

c. means for attempting to at least approximately match the first portion read with the second portion read;

d. means for identifying a first location for the first portion in the first file and a second location for the second portion in the second file, responsive to the attempting step indicating at least an approximate match between the first portion read and the second portion read;

e. means for inserting a link to the first location into the second file, responsive to the attempting step indicating at least an approximate match between the first portion read and the second portion read;

f. means for inserting a link to the second location into the first file, responsive to the attempting step indicating at least an approximate match between the first portion read and the second portion read;

g. means for writing the first portion read into the first file; and h. means for writing the second portion read into the second file.

29. The apparatus of claim 28, further comprising:

means for locating a command, in the third file, identifying text to be attempted to be at least approximately matched; and wherein at least c and d are used in response to locating the tag.

30. The apparatus of claim 29, wherein the means for attempting comprise:

means for calculating a ratio of matching characters in the first portion and the second portion; and means for indicating at least an approximate match between the first portion and the second portion based on the ratio.

31. The apparatus of claim 30, further comprising:

means for reading a third portion of the third file;

means for locating a command in the third portion identifying a threshold associated with the ratio; and means for indicating at least an approximate match between the first portion and the second portion based on the ratio.

32. The apparatus of claim 28, wherein the means for writing into the first file and the means for writing into the second file comprise means for writing in a format suitable for reading by a web browser.

33. The apparatus of claim 32, further comprising:

means for displaying the first and second files in different frames of a web browser window.

34. The apparatus of claim 28, further comprising:

means for reading a third portion of the third file;

means for attempting to locate a tag in the third portion; and means for writing the third portion into the first file in response to not locating a tag in the third portion.

* * * * *